No. 642,251. Patented Jan. 30, 1900.
H. A. NOLTE.
DISK CULTIVATOR ATTACHMENT.
(Application filed June 5, 1899.)
(No Model.) 2 Sheets—Sheet 1.
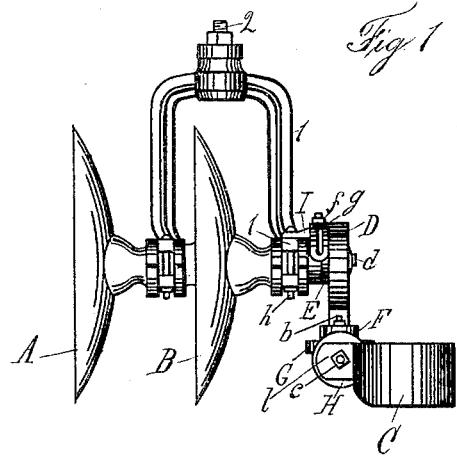
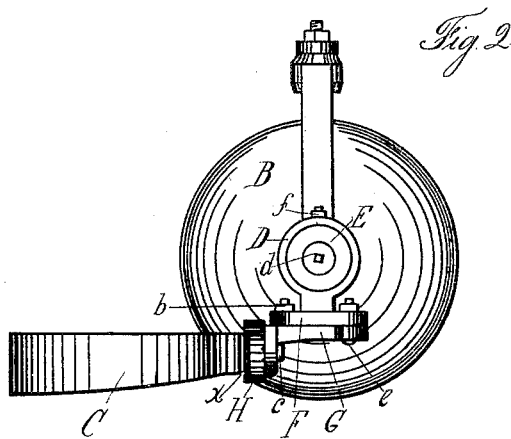
WITNESSES
C. F. Patterson
M. A. Dodsworth
INVENTOR
Henry A. Nolte
PER
G. W. Sues.
ATTORNEY No. 642,251. Patented Jan. 30, 1900.
H. A. NOLTE.
DISK CULTIVATOR ATTACHMENT.
(Application filed June 5, 1899.)
(No Model.) 2 Sheets—Sheet 2.
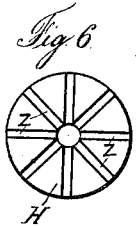
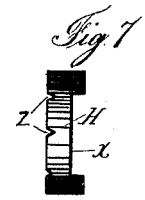
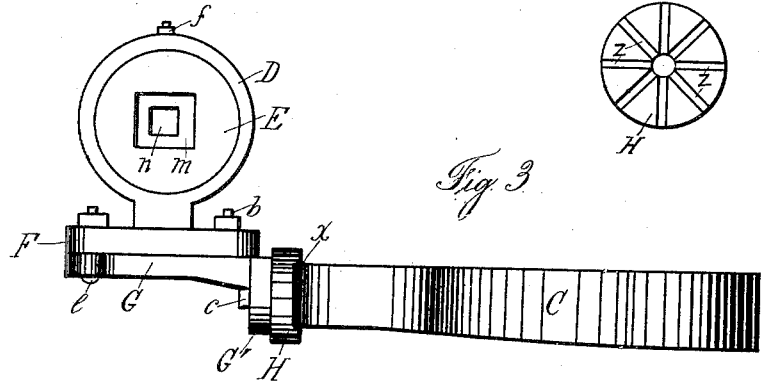
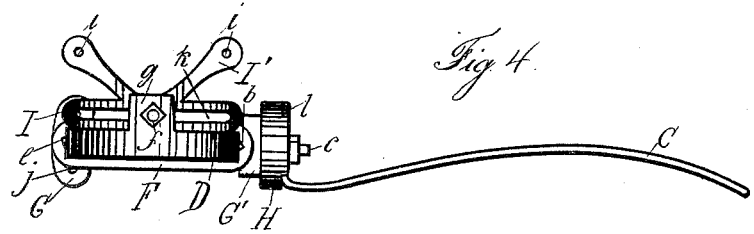
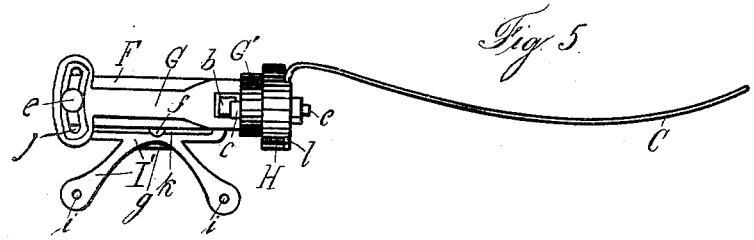
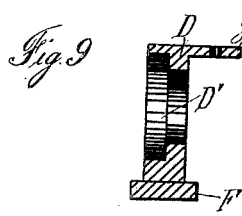
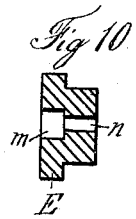
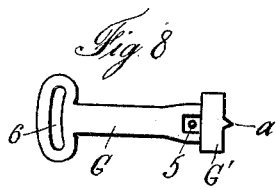
WITNESSES
C. F. Patterson
W. A. Dodsworth
INVENTOR
Henry A. Nolte
PER
G. W. Sues
ATTORNEY
THE NORRIS PETERS CO., PHOTO-LITHO., WASHINGTON, D. C.

UNITED STATES PATENT OFFICE.

HENRY A. NOLTE, OF ELKHORN, NEBRASKA.

DISK-CULTIVATOR ATTACHMENT.

SPECIFICATION forming part of Letters Patent No. 642,251, dated January 30, 1900.

Application filed June 5, 1899. Serial No. 719,438. (No model.)

*To all whom it may concern:*

Be it known that I, HENRY A. NOLTE, residing at Elkhorn, in the county of Douglas and State of Nebraska, have invented certain useful Improvements in Disk-Cultivator Attachments; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement relating to disk-cultivator attachments.

The object of my invention is to provide a disk-cultivator attachment by means of which the smaller finer particles of soil may be carried against the young plants without cutting off or injuring the lateral roots. This attachment can be used in connection with any disk cultivator and for every crop growing in hills or rows, such as cotton, sorghum, corn, or potatoes.

In the accompanying drawings I have shown in Figure 1 an elevation of a portion of a disk cultivator, showing two ordinary disks in position and further disclosing my attachment in position. Fig. 2 shows a side elevation of a portion of a disk cultivator provided with my attachment. Fig. 3 shows an enlarged detached detail disclosing the side elevation of the knife. Figs. 4 and 5 show, respectively, a top and bottom view of one of the knives in connection with the attaching mechanism. Figs. 6 and 7 represent, respectively, a front and edge view of the knife-holding disk as used in my invention. Fig. 8 shows a top view of the bracket as used in my invention. Fig. 9 shows a view of the hanger as used in my invention, while Fig. 10 shows a detail of the holder as used in my invention.

My invention is adapted to be used in connection with any ordinary disk cultivator in which the disks are secured to a suitable shaft.

My device embodies, essentially, a blade or knife C, which is secured by means of a bolt $c$ to a disk H, which disk is provided with a depression $x$, as is shown more particularly in Figs. 2 and 7, and in which depression the end 1 of the knife fits. This bolt $c$ after passing through the disk and knife is secured to the downwardly-extending web G' of the bracket G, as is shown more clearly in Fig. 3. This disk H is provided upon the face which comes adjoining to the bracket G with a series of grooves $z$, as shown in Figs. 6 and 7, within which is adapted to rest a projection $a$, as shown in Fig. 8. By means of this rib $a$ and the groove $z$ the disk H and connected knife C may be locked in a certain position. The bracket G is further provided with an opening 5, adapted to receive a bolt $b$, and a radial opening 6, within which is held a bolt $e$, as will be understood in referring to Figs. 3 and 8, so that this bracket G may be movably and adjustably secured to the base F of the hanger D, as is shown in Fig. 3, which hanger is provided with a depression D', so as to receive the holder E, (shown in Fig. 10,) which is provided with an opening $n$, passing clear through the same, as well as a larger opening $m$, as is shown in Fig. 10.

Secured to the hub of the disk cultivator at any suitable point is a strider comprising the loop I, as is shown in Fig. 4, having a slot $k$, and the projecting ears I', having the openings $i$, so that this strider may be secured at a suitable point to the hub of the cultivator.

The holder E used in my invention is so arranged that the same may be secured to the projecting axle $d$ of the disk cultivator to which it is to be secured and is intended to be fixed to that shaft $d$ by means of a suitable nut.

In Figs. 1 and 2 I have shown my attachment as secured to a portion of the frame $l$ of an ordinary disk cultivator. Now it will be noticed that the knife C that I use in my invention is curved outward, so that as the soil is cut by the cultivator-disks and carried toward this knife C this knife acts in breaking the lumps and carrying the smaller particles nearer to and against the plants that are being cultivated. This is a great advantage in that this knife does not penetrate in the earth as deeply as do the disk cultivators, and for that reason the young roots of the plants being cultivated are not injured, while the deeper penetrating cultivator-disks adjacent to this knife deeply and properly cultivate the soil. Ordinarily in disk cultivators it is customary to mount three cultivator-disks upon the shaft. In my invention I eliminate one of the cultivator-disks and use my knife in place of the disk that comes nearest the plants to be cultivated. It is of course understood by all those familiar with disk cultivators that these frames $l$ holding the cultivator-disks may be set at any angle, so as to throw the soil toward or away from the plants. My cultivator attachment embodying, primarily, the knife C is also arranged so that the same may be set at any angle independent of the angle imparted to the cultivator-disks proper.

In Fig. 1 I have shown the frame of a well-known disk cultivator, which is provided with the disks A and B, but from which the third disk has been removed to give place to my knife C. It is also understood that these cultivator-disks are used in sets of two or more, so that there would be two or more knives used in my invention, so that when properly arranged the plants to be cultivated pass between two of my knives C C, while the usual disks cultivate the earth adjoining the plant-roots, as is usual.

In my drawings I have confined the instrumentalities as especially adapted to be used in connection with a certain well-known make of rotary disk cultivators; but it is of course understood that the instrumentalities by means of which the cutter-knives are used in place of the inner disks make the adjustment by means of the various instrumentalities more readily adapted to the structural peculiarities of the various makes, and I wish it understood that I do not desire to confine myself to the precise construction and arrangement of parts as disclosed in my invention, for the reason that the same may be changed without departing from the spirit of my invention; and now,

Having thus described my said invention, what I claim as new, and desire to secure by United States Letters Patent, is—

1. In a cultivator, the combination with a series of cutter-disks, of a hanger adjustably secured adjacent to one of said cutter-disks, a holder adjustably secured to said hanger, a bracket adjustably secured to said holder, and a knife adjustably secured to said bracket, adapted to operate substantially as and for the purpose set forth.

2. The combination with a cultivator-frame, of a holder adjustably secured to said frame, a bracket pivotally secured to said frame, and a dragging-knife pivotally secured to said bracket and adjustable in a horizontal plane, as and for the purpose set forth.

Signed in the presence of two witnesses.

HENRY A. NOLTE.

Witnesses:
 GEORGE W. SUES,
 CLEMENT F. PATTERSON.